March 29, 1960 C. C. HALL 2,930,509

TABLET COUNTING MACHINE

Filed Feb. 26, 1957 2 Sheets-Sheet 1

INVENTOR.
CLAUDE C. HALL
BY
Busser Smith & Hardy
ATTORNEYS

March 29, 1960 C. C. HALL 2,930,509

TABLET COUNTING MACHINE

Filed Feb. 26, 1957 2 Sheets-Sheet 2

*INVENTOR.*

CLAUDE C. HALL

BY Jessup Smith & Hardy

ATTORNEYS 2,930,509

TABLET COUNTING MACHINE

Claude C. Hall, Springfield, Pa., assignor to Smith, Kline & French Laboratories, Philadelphia, Pa., a corporation of Pennsylvania Application February 26, 1957, Serial No. 642,460

4 Claims. (Cl. 221—265)

This invention relates to a tablet counting machine and, more particularly, relates to a novel disc for such a machine.

It is known to count pharmaceutical tablets and similar objects through the employment of a rotatable disc provided with openings adapted to hold a predetermined number of the objects to be counted in combination with a stationary disc provided with an opening through which the objects being counted can discharge. Such a structure is shown, for example, in U.S. Patent 964,782 issued to A. M. Hull on July 19, 1910.

In accordance with this invention there is provided a rotatable counting disc which, instead of containing but a single tablet in each opening, contains two tablets in each opening. Further, the desired result is achieved not by doubling the thickness of the disc and hence the depth of each opening which would result in an excessively large and bulky disc and also cause difficulty in discharging due to the shingling action of the tablets but rather by providing openings each having varying dimensions so that one tablet is disposed substantially on edge while the other tablet is disposed substantially on its face.

It is therefore the broad object of this invention to provide a rotatable counting disc for a tablet counting machine which has openings each adapted to contain a plurality of tablets.

It is a further object of this invention to provide a relatively thin rotatable counting disc for a tablet counting machine which has openings each adapted to contain a plurality of tablets.

It is a further object of this invention to provide a rotatable counting disc for a tablet counting machine which has openings each adapted to contain a plurality of tablets and which prevents the tablets from interlocking in the openings.

These and other objects will become apparent on reading the following description in conjunction with the drawings in which.

Figure 1:
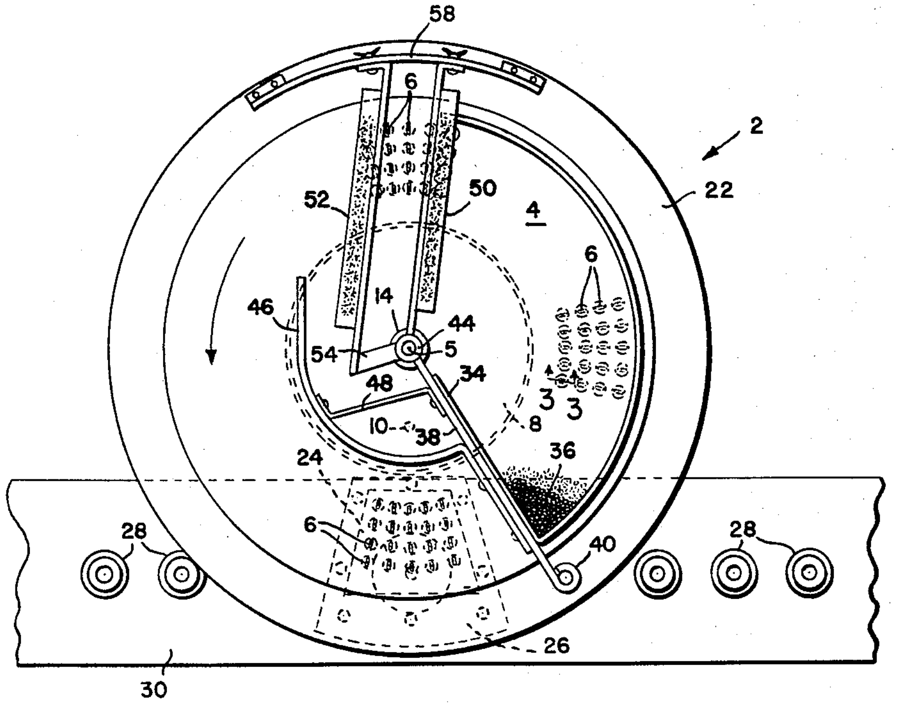
Figure 1 is a view taken on the plane, indicated by the line 1—1 in Figure 2, of a tablet counting machine employing a disc in accordance with this invention.
Figure 4:
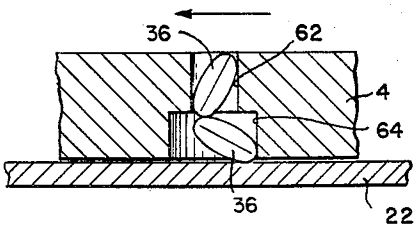
Figure 4 is a vertical section corresponding to the showing of Figure 3 and shows the tablets of Figure 3 further advanced into the opening.
Figure 3:
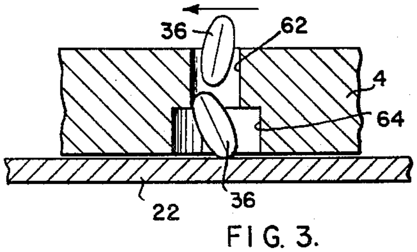
Figure 3 is a vertical section of an opening in the rotatable counting disc of Figure 1 taken on the plane indicated by the line 3—3 in Figure 1 and showing a pair of tablets falling into the opening.
Figure 6:
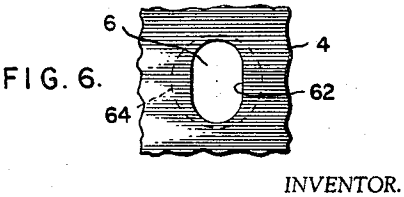
Figure 6 is a plan view of the opening shown in Figure 3.
Figure 5:
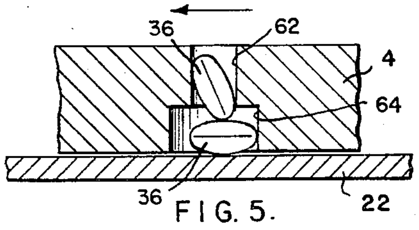
Figure 5 is a vertical section corresponding to the showing of Figure 3 and shows the tablets in their final position in the opening.
Figures 2, 7, 8, 9, 10:
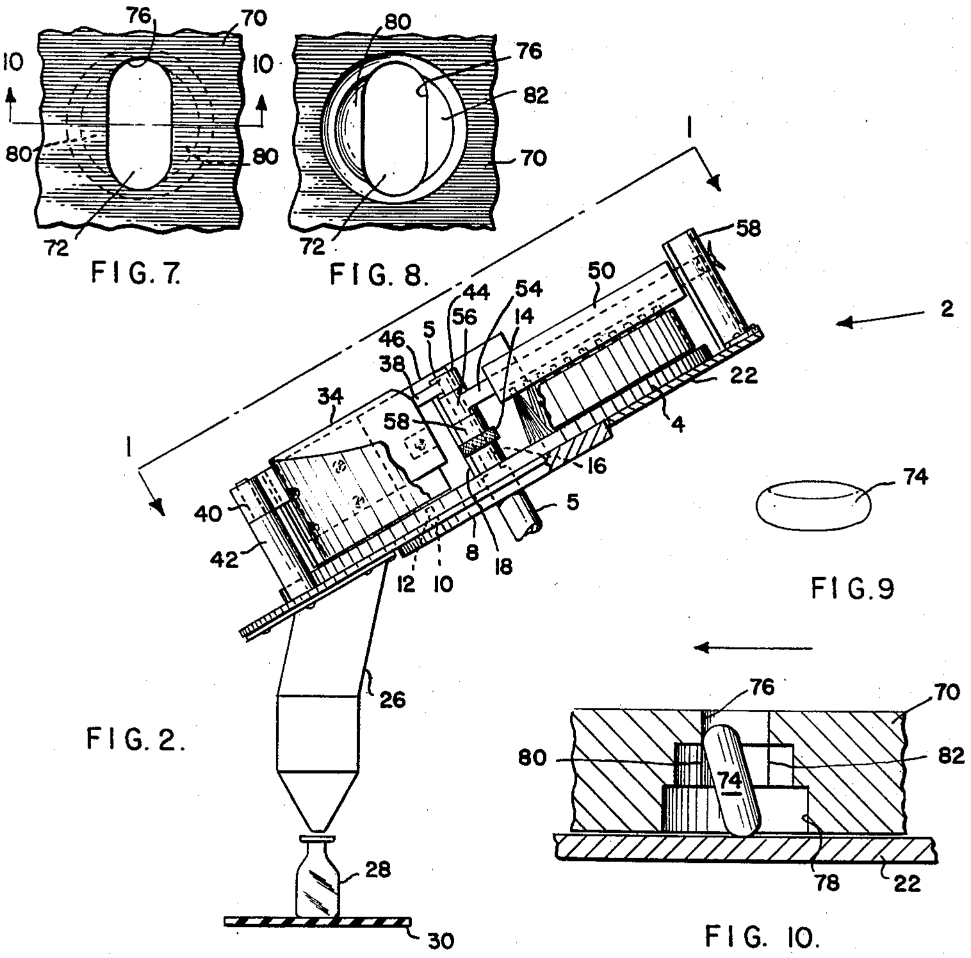
Figure 2 is a side elevation of the machine of Figure 1 partially broken away.
Figure 7 is a top plan view of a modified disc opening.
Figure 8 is a bottom plan view of the disc opening of Figure 7.
Figure 9 is a perspective view of a circular tablet.
Figure 10 is a vertical section taken on the plane indicated by the line 10—10 in Figure 7 and showing the tablet of Figure 9 entering the disc opening.

Referring now to Figures 1 and 2, a tablet counting machine 2 has a rotatable counting disc 4 provided with openings 6 for the reception of tablets. Disc 4 is carried by a flange 8 on drive shaft 5 which is driven by any suitable driving means, for example, an electric motor (not shown). The driving connection between flange 8 and disc 4 is provided by a sheer pin 10 mounted on flange 8 and passing into an opening 12 in disc 4. A knurled member 14 is threaded onto a reduced portion 16 of shaft 5 and is screwed down close to hub 18 on disc 4 to act as a retainer for disc 4.

A stationary disc 22 is mounted immediately below disc 4 and acts to close the bottom of the openings 6 in disc 4. In order to permit the discharge of tablets from openings 6, disc 22 is provided with an opening 24 to which is connected a discharge conduit 26 which is adapted to discharge into a container 28 on a support 30.

A barrier 34 acts to retain a supply of beveled tablets 36 over a portion of the path of opening 6. Barrier 34 is carried by a support member 38 which has a collar 40 mounted on a post 42 secured to stationary disc 22. A collar 44 on the other end of support member 38 passes freely over shaft 5. A deflecting barrier 46 is secured to support member 38 by bracket 48. Brushes 50 and 52 are secured to a support member 54 which has a collar 56 which passes freely over shaft 5 and rests on a spacer 58. Collar 56 acts to support collar 44 of support member 38. It will be understood that shaft 5 is free to rotate with collars 44 and 56 and spacer 58. Support member 54 is secured to a bracket 58 which, in turn, is secured to disc 22. Brushes 50 and 52 function to prevent, in conjunction with barrier 46, tablets from being carried around by disc 4 to the discharge position except where the tablets are in openings 6.

The tablet counting machine, as described above, is known to the art with the exception of the structure of the openings 6 which will now be described.

Referring to Figures 1 and 3 through 6, it will be seen that opening 6 has an upper cavity 62 and a lower cavity 64. Each upper cavity 62 is elongated along a radius of disc 4, the length of cavity 62 is sufficiently greater than the diameter of the tablet involved to permit ready entrance of a tablet but will preferably not be over 50% greater than the diameter of the tablet. Similarly, the width of the cavity 62 is sufficiently greater than the width of the tablet to permit ready entry of the tablet but preferably is not greater than 50% wider than the width of the tablet. The depth of cavity 62 will be such that the upper tablet 36 will be below the top of the disc, preferably in the vicinity of the diameter of the tablet. Cavity 64 is of sufficient size to permit a tablet passing downwardly through cavity 62 and lying in cavity 64 on its face in a position to support a second tablet on its edge in cavity 62. It is preferred to have cavity 64 take the form of a circular bore which has a diameter substantially greater than the diameter of the tablet and a depth substantially greater than the width between faces of the tablet. As disc 4 is rotated counterclockwise as viewed in Figure 1 by means of shaft 5, flange 8 and sheer pin 10, openings 6 pass under tablets 36 retained by barrier 34. Considering a single opening, a tablet 36 falls edgewise into upper cavity 62 and drops downwardly until it comes into contact with stationary disc 22. As viewed in Figures 3 through 5, the frictional engagement of a tablet 36 with disc 22 results in the toppling of the tablet 36 onto one of its faces. A second tablet entering cavity 62 drops downwardly until it engages the upper face of the tablet already retained in cavity 64 and acts to block the entry of further tablets into opening 6. Thus two tablets are held in opening 6 until disc 4 rotates opening 6 over discharge opening 24 in disc 22. Thereupon both tablets in opening 6 drop freely out of the opening and are guided by conduit 26 to a container 28.

Where it is desired to further reduce the thickness of the counting disc, particularly where employing tablets having a relatively large diameter compared to their thickness, it is advantageous to employ a modified opening in order to insure that only the desired number of tablets, for example, two, enter each opening. As shown in Figures 7 through 11, a rotating counting disc 70 having modified openings 72 for use, for example, in connection with a circular beveled tablet 74 (Figure 9) can be substituted in tablet counting machine 2 for disc 4. Opening 72 has an upper cavity 76 which is elongated on a radius of rotating counting disc 70. Cavity 76 is of sufficient width between faces to permit the passage of tablet 74 edgewise and preferably does not exceed 150% of the width of tablet 74.

Opening 72 has a cavity 78 in the form of a circular bore immediately below the lower end of cavity 76. Cavity 78 has a diameter sufficiently great to freely accommodate tablet 74 on one of its faces in a position to support a second tablet in cavity 76. Immediately above cavity 78, cavity 76 is provided with a leading recess 80 and a trailing recess 82 each of which is large enough to accommodate tablet 74.

Figure 12:
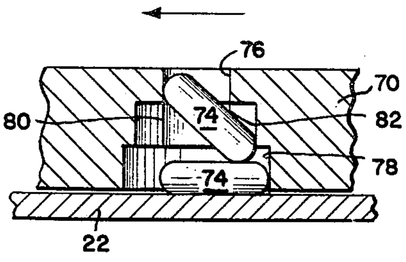
Figure 12 is a view corresponding to Figure 11 showing a pair of tablets in the opening in their final position.
Figure 11:
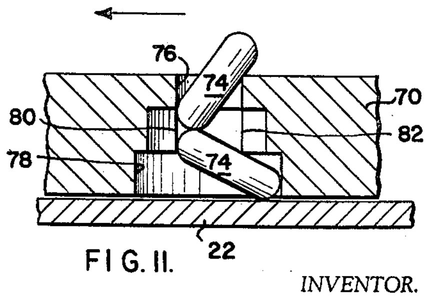
Figure 11 is a view corresponding to Figure 10 illustrating the further positioning of the first tablet entering the opening and showing, in addition, a second tablet in the opening.

In operation, as disc 70 is rotated counterclockwise, as viewed in Figures 10 through 12 above stationary disc 22, a tablet 74 enters through cavity 76 and orients itself with one of its edges against disc 22. The relative movement between the discs 70 and 22 draws the edge against disc 22 to the right as viewed in Figures 10 and 11 which insures that the tablet will fall on one of its faces, recesses 80 and 82 providing ample space for the tablet to turn over in. This tablet is then fully accommodated within cavity 78 which retains it in a position to support an edge of the next tablet 74 which enters cavity 76. This second tablet 74 is positioned in cavity 76 so that its lower end abuts against the wall of trailing recess 82 which permits this tablet 74 to fall over into a position so that it lies below the top of disc 70 but not enough so that it is free to fall into cavity 78. In this position the second tablet 74 occupies a minimum of depth and still prevents the entry of a third tablet 74. The tablet 74 retained in cavity 76 blocks the entry of further tablets into opening 72.

When disc 70 is rotated to put opening 72 over discharge opening 24 in disc 22, the two tablets 74, 74 will discharge out of opening 72 and through discharge opening 24.

It is not desired to be limited except as set forth in the following claims.

What is claimed is:

1. In a tablet counting machine having a rotatable counting disc provided with openings for the receipt of tablets in combination with a stationary disc for retaining the tablets in the rotatable disc and provided with an opening permitting the discharge of tablets from the rotatable disc at a predetermined station, the improvement comprising a rotatable disc having a plurality of openings each adapted to contain a plurality of tablets, said openings each including an upper cavity elongated substantially on a radius of the rotating disc, said elongated cavity having a length greater than the diameter of the tablets to be counted but not exceeding 150% of said diameter and a width greater than the width of the tablets to be counted but not exceeding 150% of said tablets' width and thereby adapted to contain and support between the opposite side walls thereof a tablet standing on edge, and a lower cavity having a diameter exceeding the diameter of the tablets to be counted and adapted to retain a tablet on one of its faces in a position to support a tablet in said upper cavity.

2. In a tablet counting machine having a rotatable counting disc provided with openings for the receipt of tablets in combination with a stationary disc for retaining the tablets in the rotatable disc and provided with an opening permitting the discharge of tablets from the rotatable disc at a predetermined station, the improvement comprising a rotatable disc having a plurality of openings each adapted to contain a plurality of tablets, said openings each including an upper cavity elongated on a radius of the rotating disc and thereby adapted to contain and support between the opposite side walls thereof a tablet standing substantially upright on edge, and a lower cavity adapted to accommodate an additional tablet lying flat on one of its faces, said lower cavity being adapted to retain said additional tablet in a position to support the tablet in the upper cavity, said upper cavity having leading and trailing recess portions immediately above the lower cavity to permit the turning of the tablets as they pass from the upper cavity into the lower cavity.

3. In a tablet counting machine having a rotatable counting disc provided with openings for the receipt of tablets in combination with a stationary disc for retaining the tablets in the rotatable disc and provided with an opening permitting the discharge of tablets from the rotatable disc at a predetermined station, the improvement comprising a rotatable disc having a plurality of openings each adapted to contain two tablets, said openings each including an upper cavity elongated substantially on a radius of the rotating disc, said elongated cavity having a length greater than the diameter of the tablets to be counted but not exceeding 150% of said diameter and a width greater than the width of the tablets to be counted but not exceeding 150% of said tablets' width and thereby adapted to contain and support between the opposite side walls thereof a tablet standing on edge, and a lower cavity having a diameter exceeding the diameter of the tablets to be counted and adapted to retain a tablet on one of its faces in a position to support a tablet in said upper cavity.

4. In a tablet counting machine having a rotatable counting disc provided with openings for the receipt of tablets in combination with a stationary disc for retaining the tablets in the rotatable disc and provided with an opening permitting the discharge of tablets from the rotatable disc at a predetermined station, the improvement comprising a rotatable disc having a plurality of openings each adapted to contain two tablets, said openings each including an upper cavity elongated on a radius of the rotating disc and thereby adapted to contain and support between the opposite side walls thereof a tablet standing substantially upright on edge, and a lower cavity adapted to accommodate an additional tablet lying flat on one of its faces, said lower cavity being adapted to retain said addditional tablet in a position to support the tablet in the upper cavity, said upper cavity having leading and trailing recess portions immediately above the lower cavity to permit the turning of the tablets as they pass from the upper cavity into the lower cavity.

References Cited in the file of this patent

UNITED STATES PATENTS

| | | |
|---|---|---|
| 202,625 | Avery | Apr. 23, 1878 |
| 455,840 | Selby | July 14, 1891 |
| 964,782 | Hull | July 19, 1910 |
| 1,495,178 | Hodgdon | May 27, 1924 |
| 2,742,184 | Yerkes et al. | Apr. 17, 1956 |